No. 796,989. PATENTED AUG. 15, 1905.
G. ENRICO.
CLUTCH.
APPLICATION FILED JAN. 6, 1903.

WITNESSES:
Fred White
René Buine

INVENTOR:
Giovanni Enrico,
By Attorneys,
Arthur C. Fraser & Co.

UNITED STATES PATENT OFFICE.

GIOVANNI ENRICO, OF TURIN, ITALY.

CLUTCH.

No. 796,989.  Specification of Letters Patent.  Patented Aug. 15, 1905.

Application filed January 6, 1903. Serial No. 138,019.

*To all whom it may concern:*

Be it known that I, GIOVANNI ENRICO, a subject of the King of Italy, residing in Turin, Italy, have invented certain new and useful Improvements in Clutches, of which the following is a specification.

This invention has reference to improved speed-change mechanism for a transmission-shaft by means of gear-wheels containing a friction-sleeve actuated by oil or other pressure.

Figure 1:
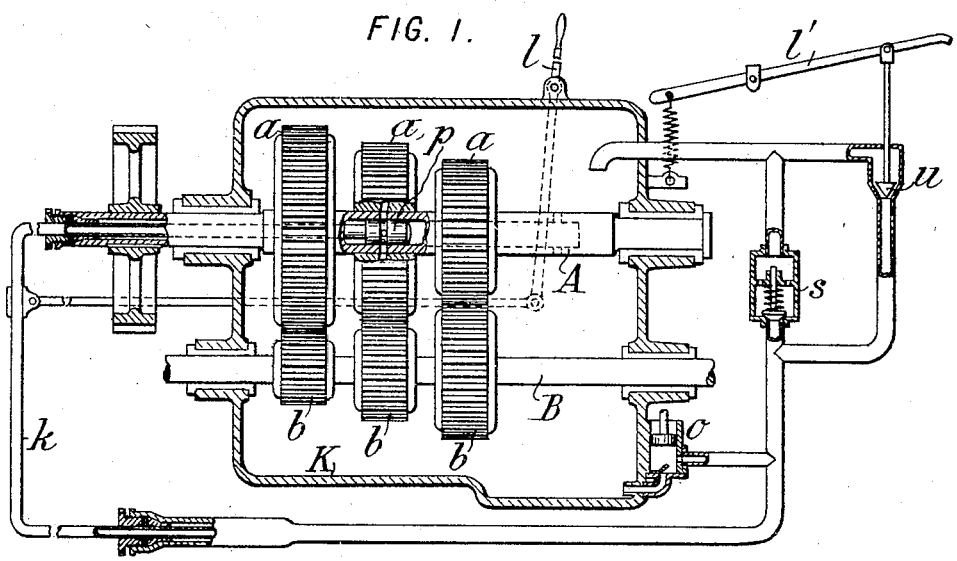
Figure 3:
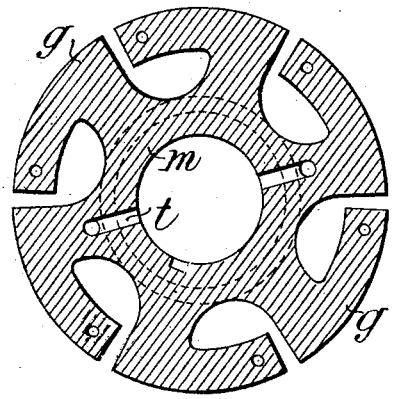
Figure 2:
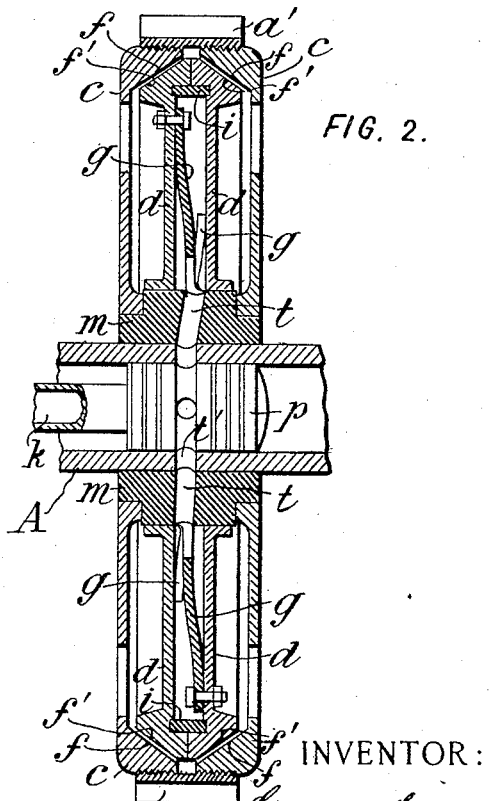

In the accompanying drawings, Figure 1 represents diagrammatically the device in question as a whole as applied to motor-vehicles driven by an explosion-motor by way of example. Upon the shaft B, which is assumed to rotate at a constant velocity, are rigidly mounted gear-wheels $b\ b\ b$ of the ordinary kind, meshing with special gear-wheels $a\ a\ a$ upon the shaft A the velocity of which it is desired to vary. Fig. 2 illustrates one of these gear-wheels $a$ in section, and the toothed crown is designated by the letter $a'$. The arms $c\ c$ of this crown rotate freely upon the hub $m$, keyed upon the shaft A, which is hollow in order to permit of the displacement of a small piston $p$, so as to apply the pressure of oil at the desired point. The arms $c$ of the gear-wheel $a$ present at their inner extremity conical faces $f$, and opposite to them are situated conical faces $f'$ of two plates $d\ d$, which are capable of lateral displacement on the hub $m$, but which rotate with it, being connected therewith by means of the flexible arms $g$, which are shown in plan in Fig. 3, but on a smaller scale. Apertures $t\ t'$, formed in the hub $m$ and in the shaft A, respectively, permit the oil under pressure supplied to the piston $p$ through a tube $k$ to enter between the plates $d\ d$, which are thereby caused to separate, and the conical faces $f'\ f'$ coming into frictional contact with the faces $f\ f$ constitute a friction-clutch by means of which the wheel $a$, receiving movement from the shaft B through the wheel $b$, Fig. 1, is caused to transmit it to the shaft A by the intermediary of the plates $d\ d$, the arms $g$, and the hub $m$. In order to produce disengagement, it is only necessary to relieve the pressure—that is to say, to displace the piston. The plates $d$ are speedily returned to their initial position, Fig. 2, by the flexible arms $g$, which cause them to overcome any pressure still existing, (if the shaft A receives movement from another gear-wheel,) owing to the centrifugal force of the oil which may remain confined between the plates $d\ d$. The ring $i$ serves to prevent the oil under pressure from escaping between the plates $d\ d$ when these latter commence to separate.

Having thus described a suitable form of gear-wheel for use in connection with my invention, I will now revert to Fig. 1. K is the casing containing oil and in which are inclosed the gear-wheels. At a suitable point O is arranged a small pump, taking its supply of oil from K and forcing it under pressure into the tube $k$, terminating at the small piston $p$. It will be understood that the pump is kept in constant operation in any well-known manner.

In order that the pressure may not exceed the desired limit, the tube $k$ is also in communication with the casing K by means of a safety-valve $s$. The valve $u$ is closed by pressing with the foot upon the lever $l'$. When the foot is raised, the valve $u$ opens and permits of the free passage of the oil, which is then no longer under pressure.

In order to produce changes of speed, it is only necessary, as above stated, to bring the piston $p$ in communication with the gear-wheel $a$ which it is desired to rigidly connect with the shaft A. This is effected by operating a lever $l$.

While I have herein described the preferred form of my invention as applied to a variable gearing, it will be understood that it is not limited to the form shown nor to this special application. The device may be considerably modified and may be utilized for other purposes—as, for instance, in braking mechanism for vehicles, &c.—without departing from the invention.

What I claim, and desire to secure by Letters Patent of the United States, is—

1. The combination of a shaft, a gear mounted loosely relatively thereto, a non-rotative casing inclosing said gear, a fluid-pressure mechanism for clutching said gear to the shaft, means for supplying pressure to said mechanism from said casing, and a manually-operated valve for controlling said fluid-pressure mechanism.

2. The combination of a shaft, a gear mounted loosely relatively thereto, a non-rotative casing inclosing said gear, a fluid-pressure mechanism for clutching said gear to the shaft, and a pump adapted to force oil from said casing to said fluid-pressure mechanism.

3. The combination of a shaft, a gear mounted loosely thereon, a fluid-pressure mechanism for clutching said gear to the shaft, a non-rotative casing inclosing said gear and adapted to contain oil, a pump adapted to force oil from said casing to said fluid-pressure mechanism, and a connection adapted to return oil to said casing.

4. The combination of a shaft, a gear mounted loosely thereon, a fluid-pressure mechanism for clutching said gear to the shaft, a non-rotative casing inclosing said gear and adapted to contain oil, a pump adapted to force oil from said casing to said fluid-pressure mechanism, a connection adapted to return oil to said casing, and a safety-valve permitting such return when the fluid-pressure becomes excessive.

5. The combination of a shaft, a gear mounted loosely thereon, a fluid-pressure mechanism for clutching said gear to the shaft, a non-rotative casing inclosing said gear and adapted to contain oil, a pump adapted to force oil from said casing to said fluid-pressure mechanism, a connection adapted to return oil to said casing, and a manually-operated valve for controlling such return.

6. In a fluid-pressure clutch, in combination a chamber for fluid, a conduit having two branches, one discharging into the chamber and furnished with pressure-controlling means, and the other discharging at a point to operate the clutch, means for forcing the fluid from said chamber into said conduit, and means for controlling admission of fluid-pressure from said conduit to said clutch.

7. In a friction-clutch, the combination of a shaft, a wheel mounted loosely thereon, two disks mounted to slide longitudinally of the shaft, fluid-pressure mechanism for moving said disks away from each other, and a spring for returning said disks to their normal positions when the fluid-pressure is reduced, comprising a plate having spring-arms connected to said disks.

In witness whereof I have hereunto signed my name in the presence of two subscribing witnesses.

GIOVANNI ENRICO.

Witnesses:
HUGO FIGGOTTE,
FELIX BAZETTA.